ISAAC N. JENNINGS, OF DANBURY, CONNECTICUT.

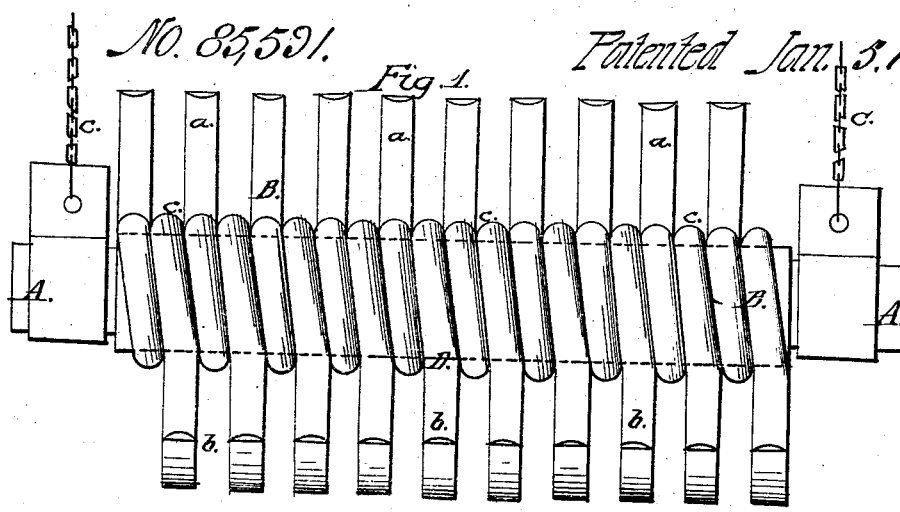
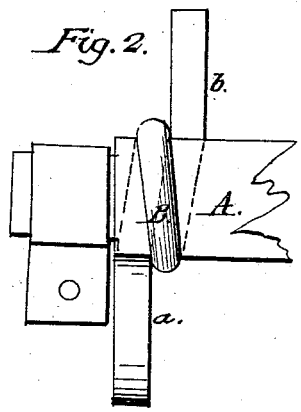
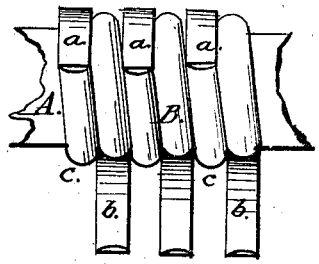
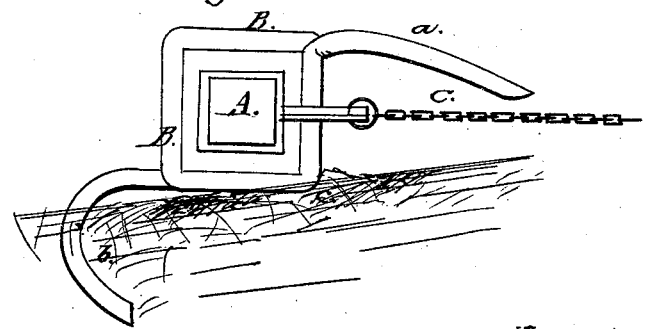

Letters Patent No. 85,591, dated January 5, 1869.

IMPROVEMENT IN PULVERIZERS.

The Schedule referred to in these Letters Patent and making part of the same.

To all whom it may concern:

Be it known that I, ISAAC N. JENNINGS, of Danbury, in the county of Fairfield, and State of Connecticut, have invented a new and improved Pulverizer; and I do hereby declare that the following is a full, clear, and exact description thereof, which will enable others skilled in the art to make and use the same, reference being had to the accompanying drawings, forming part of this specification, in which—

Figure 1 represents an inverted plan view of my improved pulverizer.

Figure 2 is a detail top view of the same.

Figure 3 is a detail front view of the same.

Figure 4 is an end view of the same.

Similar letters of reference indicate corresponding parts.

This invention relates to a new implement for pulverizing the soil, and can be used as an attachment to harrows, or independently, as may be desired.

The invention consists in applying to a horizontal beam or head a series of metal straps, which project from front and rear, those in front serving to hold down and break up loose lumps, while those in rear project downward into the ground, and pulverize the same. The lower front corner of the beam is protected by metal straps, and works on the ground, so as to prepare the same with its weight, crushing the lumps and evening the ground before the back teeth commence to act.

A, in the drawing, represents a prismatic or other beam, made of wood or other suitable material, and of suitable length.

Around it are spirally-laid metal bands B B, which project with their ends from front and rear of the beam A.

Their front ends, a, project from the front upper corner of the beam, and are bent somewhat down, as shown in fig. 4.

Their rear ends, b, project from the rear lower corner of the beam, and are bent down and forward, to form hooks, as shown.

The straps are wound close to each other, as shown in figs. 1 and 3, so that the lower front corner of the beam will be entirely covered with metal, as shown.

The beam is either pivoted in the frame of a harrow or is directly fastened to the draught-chains C C, or to other suitable apparatus, so as to be drawn over the ground with its lower front corner, c, resting thereon. It will then, by its weight, crush and even the ground before the teeth b act on it. These teeth b work in the ground, and tear it well up and pulverize it thoroughly, while the front teeth a prevent any lumps from passing over the beam, and break them up.

The teeth may also be separately fastened to the beam, without being spirally wound around the same, in which case they may be secured by means of bolts or rivets, the front and rear teeth being made of separate pieces.

Having thus described my invention,

I claim as new, and desire to secure by Letters Patent—

1. A pulverizer, consisting of the beam A, from which the upper front and the lower rear teeth, a and b, respectively project, substantially as herein shown and described.

2. Covering the lower front corner, c, of a pulverizer-beam, A, with metal, to make it operate in conjunction with the front and rear teeth, a and b, substantially as herein shown and described.

ISAAC N. JENNINGS.

Witnesses:
FRANK BLOCKLEY,
ALEX. F. ROBERTS.